United States Patent [19]
Shibayama et al.

[11] Patent Number: 5,148,378
[45] Date of Patent: Sep. 15, 1992

[54] SENSOR CONTROLLER SYSTEM

[75] Inventors: Masahiko Shibayama, Otsu; Hiroichi Kuroda, Nagaokakyo; Seiji Shimada, Kameoka; Umekichi Kai, Kyoto, all of Japan

[73] Assignee: Omron Corporation, Kyoto, Japan

[21] Appl. No.: 615,713

[22] Filed: Nov. 19, 1990

Related U.S. Application Data

[63] Continuation of Ser. No. 524,317, May 17, 1990, abandoned, which is a continuation of Ser. No. 437,559, Nov. 17, 1989, abandoned.

[30] Foreign Application Priority Data

Nov. 18, 1988 [JP] Japan ................. 63-292964
Nov. 25, 1988 [JP] Japan ................. 63-299079
Nov. 25, 1988 [JP] Japan ................. 63-299081

[51] Int. Cl.⁵ ............... G06F 15/46; G01B 21/00
[52] U.S. Cl. ............... 364/571.07; 364/571.01; 364/473; 371/25.1
[58] Field of Search ............ 364/571.01-571.08, 364/555, 468-473; 250/204; 371/15.1, 25.1, 28, 26; 73/1 R

[56] References Cited

U.S. PATENT DOCUMENTS

| | | | |
|---|---|---|---|
| 3,868,498 | 2/1975 | Guggenbühl | 364/571.02 |
| 4,249,244 | 2/1981 | Shofner et al. | 364/571.05 |
| 4,364,027 | 12/1982 | Murooka | 364/571.05 |
| 4,412,328 | 10/1983 | Homa | 371/15.1 |
| 4,473,797 | 9/1984 | Shiota | 364/571.04 |
| 4,497,057 | 1/1985 | Kato et al. | 371/15.1 |
| 4,519,075 | 5/1985 | Kawaguchi | 371/15.1 |
| 4,553,217 | 11/1985 | Daudt et al. | 364/473 |
| 4,615,321 | 10/1986 | Haefner et al. | 364/571.05 |
| 4,639,263 | 1/1987 | Kulikauskas | 364/473 |
| 4,649,515 | 3/1987 | Thompson et al. | 371/15.1 |
| 4,701,867 | 10/1987 | Brüggemann | 371/25.1 |
| 4,799,220 | 1/1989 | Nielsen | 371/25.1 |
| 4,937,764 | 6/1990 | Komatsu et al. | 364/525 |
| 5,016,201 | 5/1991 | Bryan et al. | 364/571.04 |

FOREIGN PATENT DOCUMENTS 0034088 8/1981 European Pat. Off.
2142152 6/1983 United Kingdom.

Primary Examiner—Kevin J. Teska
Attorney, Agent, or Firm—Foley & Lardner

[57] ABSTRACT

A sensor controller system, comprising a plurality of sensors for producing detection signals, and a sensor controller for receiving outputs form said sensors and producing an evaluation signal for an external circuit. To detect any fault in the sensors, the outputs from the sensors are compared with certain standard values stored in the sensor controller so that any fault in any one of the sensors may be detected as a disagreement between actually obtained outputs from the sensors and the stored standard values. Optionally, a diagnostic signal may be used to simplify the comparing process. Because the states of the sensors may be centrally monitored and the standard outputs can be centrally modified, the versatility of the sensor system may be increased and the reliability of the sensor system may be improved.

8 Claims, 12 Drawing Sheets

| | S2 | S3 | S4 | S5 | S6 | |
|---|---|---|---|---|---|---|
| | 1 | 1 | 1 | 1 | 1 | 23 |
| | 0 | 0 | 1 | 1 | 1 | 23a |
| | 1 | 1 | 0 | 0 | 1 | 23b |
| | 1 | 0 | 0 | 1 | 1 | 23c |

SENSOR CONTROLLER SYSTEM

This is a continuation of application Ser. No. 07/524,317, filed May 17, 1990, (Abandoned) which is a continuation of Ser. No. 07/437,559, filed Nov. 17, 1989, (Abandoned).

TECHNICAL FIELD

The present invention relates to a sensor controller system comprising a plurality of sensors and a sensor controller, and in particular to such a sensor controller system which can detect the soundness of the sensors.

BACKGROUND OF THE INVENTION

According to a conventional sensor controller system, the state of the articles which are being continually conveyed by a conveyer belt or the like is detected by using a plurality of sensors. The sensors may detect the spacing between articles such as bottles conveyed by the conveyer belt, position of a label on each of the bottles, and so on. In such a sensor controller system, a plurality of sensors such as photoelectric sensors are used to detect the conditions of the articles themselves and the way they are being conveyed.

As these sensors typically consist of reflection type and transmission type photoelectric sensors, there is a possibility that any one of the sensors becomes incapable of functioning properly. For instance, deposition of dust and other foreign matters on light emitting or receiving surfaces would cause reduction in the amount of light emitted or received. The axes of light beams may deviate from prescribed paths due to mechanical failures, and sensor elements themselves may become inoperative as a result of various electric failures. Therefore, it is desirable to provide means for monitoring the soundness of sensors so that any failures may be corrected without causing costly delays.

BRIEF SUMMARY OF THE INVENTION

In view of such problems of the prior art, a primary object of the present invention is provide a sensor controller system which is cable of detecting any failure in any one of its sensors without significantly disrupting the operation of the machinery to which the sensor controller system is applied.

A second object of the present invention is to provide a sensor controller system which can diagnose its sensors without requiring any complex arrangement.

A third object of the present invention is to provide a sensor controller system which permits diagnosis of its sensors even when they are not equipped with any external diagnostic function.

A fourth object of the present invention is to provide a sensor controller system which can readily adapt itself to various changes in the environment of its operation.

According to the present invention, these and other objects of the present invention can be accomplished by providing a sensor controller system, comprising: a plurality of sensors for producing detection signals; a sensor controller for receiving outputs from the sensors and producing an evaluation signal for an external circuit; diagnostic signal generating means for supplying a diagnostic signal to each of the sensors; storage means for storing a sensor output table listing expected changes in outputs of the sensors when the diagnostic signal is supplied to the sensors; and sensor evaluation means for evaluating the soundness of each of the sensors by comparing changes in actual outputs from the sensors with the changes in outputs listed in the sensor output table.

Thus, the soundness of each of the sensors can be readily determined. Preferably, the sensor evaluating means is incorporated in the sensor controller so that the sensors distributed over a wide area may be centrally diagnosed without requiring each sensor to be diagnosed individually and separately. Also, some of the sensors may be unable to respond to the diagnostic signal and, in that case, the corresponding listings in the sensor output table should specify no changes.

According to a certain aspect of the present invention, there is provided sensor controller system, comprising: a plurality of sensors for producing detection signals; a sensor controller for receiving outputs from the sensors and producing an evaluation signal for an external circuit; storage means for storing all possible output patterns from the sensors; and sensor evaluation means for evaluating the soundness of each of the sensors by comparing an actual output pattern obtained from the sensors with the pattern stored in the storage means.

Thus, the sensors may be diagnosed while they are functioning in normal way without disrupting their operation in any way. Further, the system is not complicated even when the number of the sensors is extremely large.

According to another aspect of the present invention, there is provided a sensor controller system, comprising: a sensor for producing a detection signal; a sensor controller for receiving the detection signal from the sensor and producing an evaluation signal for an external circuit; comparators for defining a threshold level and indeterminate regions below and/or above the threshold level; timer means for producing a first abnormal state output when an input to the sensor has continued to be in the indeterminate region for more than a certain prescribed time period, and means for varying the prescribed time period.

Thus, a high diagnostic accuracy can be achieved, and, in some cases, potential failures may be detected before they develop into serious ones. If desired, counting means may be used to count the occurrence of the first abnormal state output from the timer means and producing a second abnormal state output when the count has reached a threshold count to improve accuracy of failure detection. In any case, to permit easy adaptation of the system to the changes in the objects which are intended to be detected by the sensors, it is preferred that parameters such as the prescribed time period for the timer means and/or the threshold count of the counting means may be varied from a central control panel.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
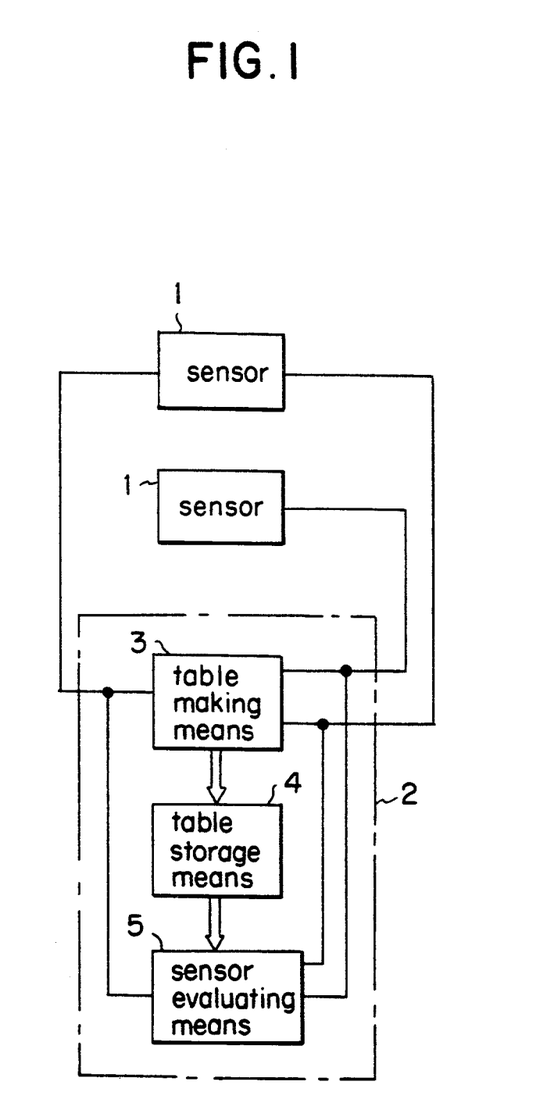
FIG. 1 is a block diagram showing a functional structure of a first embodiment of the present invention.

FIG. 1 shows the functional structure of a first embodiment of the sensor controller system of the present invention. The first embodiment comprises a plurality of sensors 1 at least one of which is provided an external diagnostic function, a sensor controller 2 which supplies a diagnostic signal to each of the sensors and determines the state of each of the sensors according to its output in response to the diagnostic signal. The sensor controller 2 comprises sensor table making means 3 for making a sensor table, listing changes which are expected in the outputs of the sensors when the diagnostic signal is supplied to the sensors 1, table storage means 4 for storing the sensor table, and sensor evaluating means 5 for comparing actual changes in the outputs from the sensors with the listings of the sensor table when the diagnostic signal is supplied to the sensors and producing a sensor abnormal signal when any disagreement is found therebetween.

Figure 2:
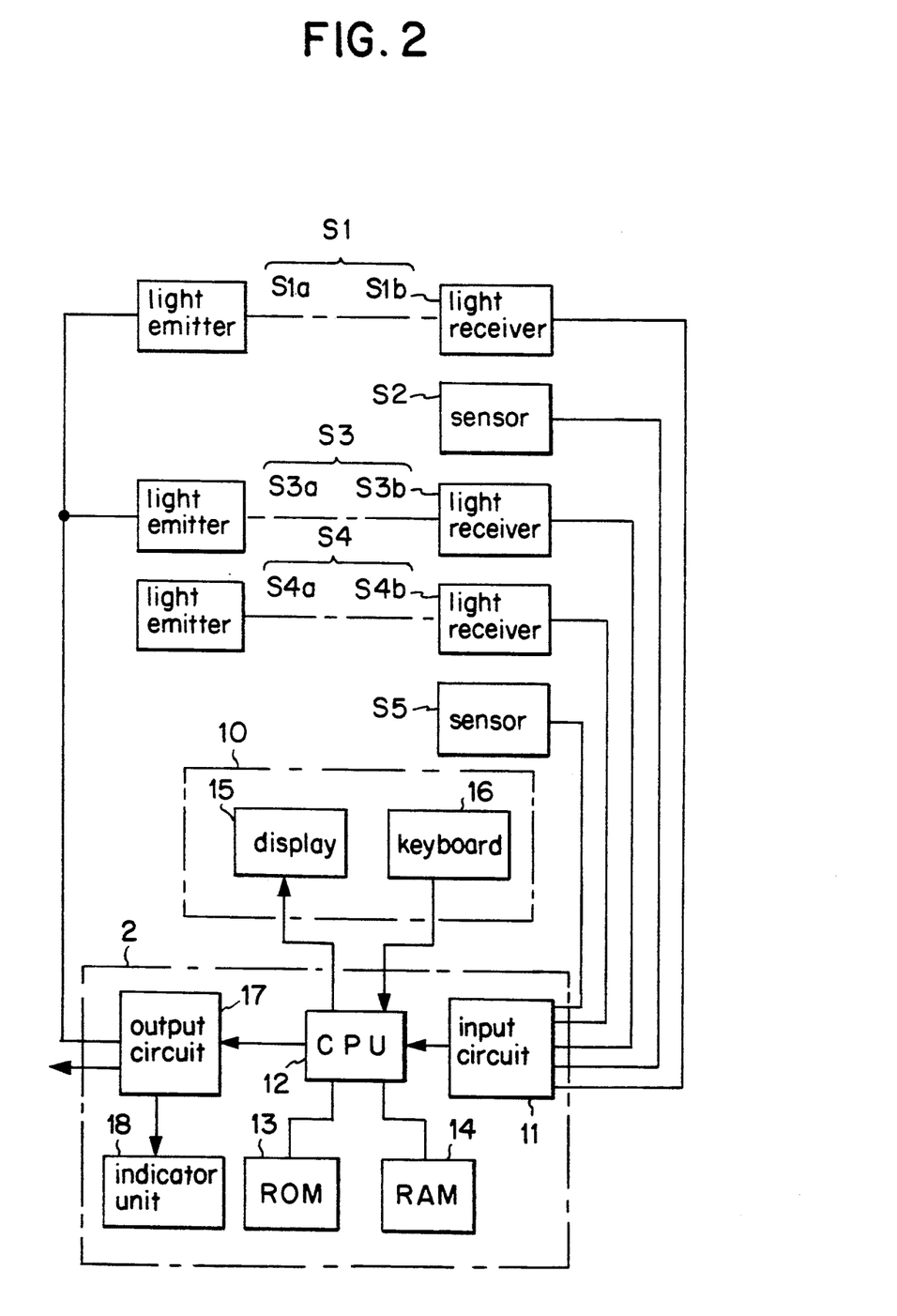
FIG. 2 is a block diagram showing the overall structure of the first embodiment of the present invention.
Figure 3:
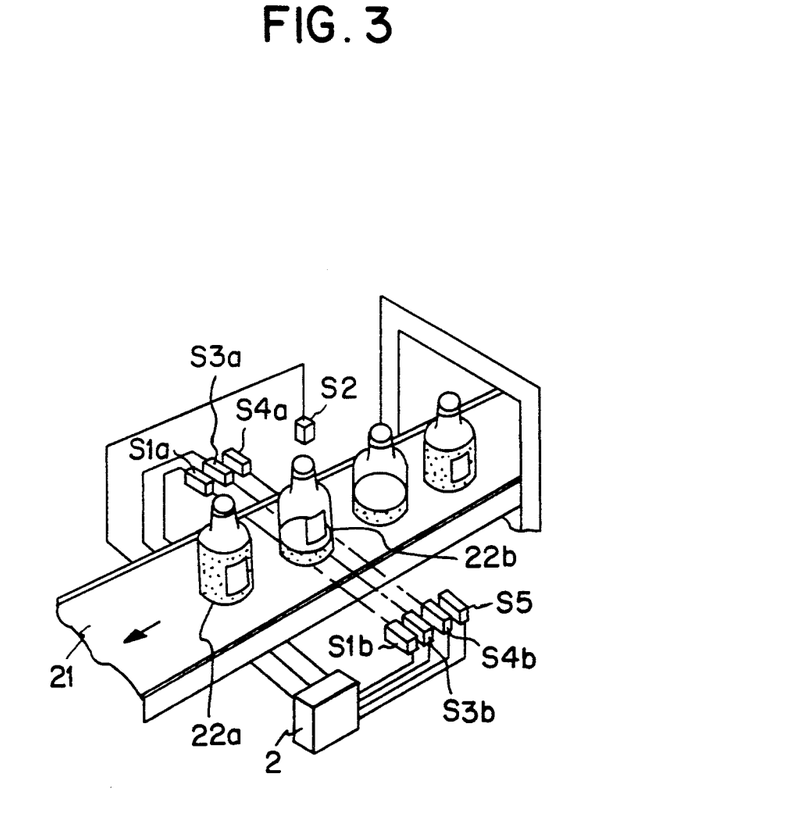
FIG. 3 is a perspective view of an arrangement of the sensors and the sensor controller applied to a monitoring system for bottles carried by a conveyer belt.

FIG. 2 is a block diagram showing the overall hardware structure thereof, and FIG. 3 is a view illustrating the arrangement of sensors 1 and a sensor controller 2 which are included in the sensor controller system. As shown in these drawings, the sensor controller 2 of the present embodiment is connected to a plurality of sensors S1 through S5. The sensors S1 and S3 each consist of a transmission type photoelectric sensor comprising a light emitter S1a or S3a and a light receiver S1b or S3b, and are provided with an external diagnostic function. The sensors S2 and S5, on the other hand, consist of reflection type photoelectric sensors which are not equipped with any external diagnostic function. The sensor S4 consists of a transmission type photoelectric sensor consisting of a light emitter S4a and a light receiver S4b, but is not equipped with any external diagnostic function. The light emitters S1a and S3a of the photoelectric sensors S1 and S3 having an external diagnostic function receive an external diagnostic signal from the sensor controller 2.

The sensor controller 2 is provided with a detachable control panel 10, and is provided with an input circuit 11 for converting the level of the signal obtained from each of the sensors or their light receivers. The output from the input circuit 11 is supplied to a CPU 12. To the CPU are connected read-only-memory (ROM) 13 and random-access-memory (RAM) 14 serving as memory means. The RAM 14 forms the table storage means 4 which is provided with an area for a sensor table for determining the presence of an external diagnostic function and retaining the result of this determination process. To the CPU 12 are connected a display unit 15 and a keyboard 16 of the control panel 10 for permitting the input state of the sensor controller 2 to be set up as required. Further, an output circuit 17 is connected to the CPU 12 to supply its output to the external diagnostic input terminals of the sensors and an external circuit such as a central controller not shown in the drawings, and to an indicator unit 18.

This sensor control system is used, for instance, for detecting the conditions of bottles 22a, 22b, ... which are being conveyed on a conveyer belt 21 in the direction indicated by the arrow in FIG. 3, such as the spacing between the bottles, the presence of a cap and a label on each bottle, and so on. In other words, the presence and conditions of the bottles conveyed by the conveyer belt 21 as detected by the sensors S1 through S5 are sent to the sensor controller 2, and an appropriate evaluation is carried out thereby. The output from the sensor controller 2 may be supplied to a central controller or other external circuits so that necessary actions may be taken according to the results of sensor detection and sensor diagnosis.

Now the operation of the present embodiment is described in the following.

Figure 4:
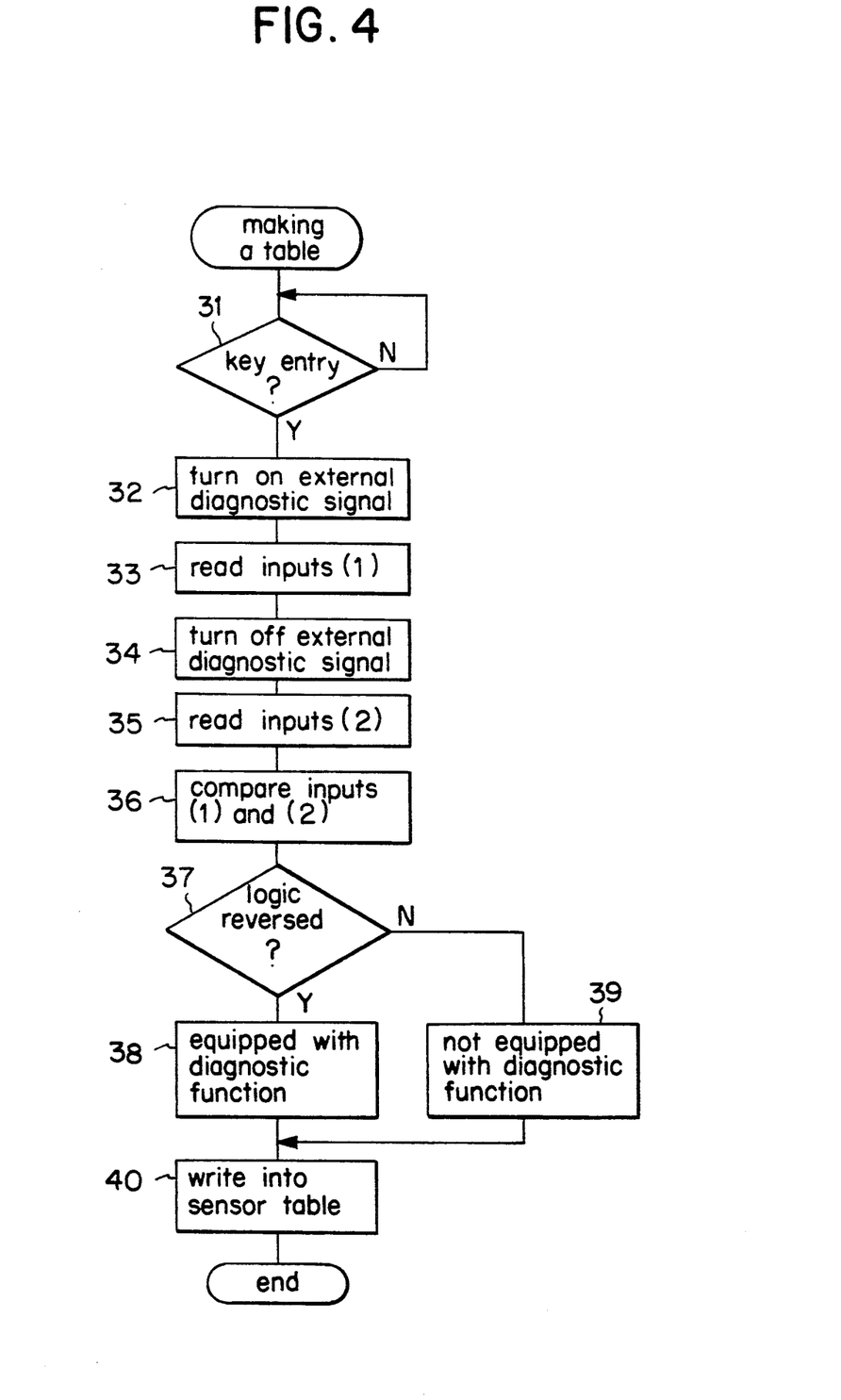
FIG. 4 is a flow chart showing the teaching process for the first embodiment of the present invention.

FIG. 4 is a flow chart illustrating the process of making a sensor table. First of all, in step 31, it is decided which of the sensors are going to be included in the intended diagnostic process by entering appropriate commands from the keyboard 16, and it is also determined which of them are equipped with an external diagnostic function before making a sensor table. When a sensor assignment input from the keyboard 16 is completed, the program flow advances from step 31 to step 32 and an external diagnostic output from the output circuit 17 is turned on. As a result, the emission of light from the light emitter S1a and S3a of the transmission type photoelectric sensors S1 and S3 is discontinued. However, the light emitter S4a of the sensor S4 does not stop emitting light. Then, the program flow advances to step 33 where the inputs (inputs 1) from the sensors S1 through S5 are read through the input circuit 11. This data is temporarily stored in the RAM 14, and the program flow advances to step 34 where the external diagnostic output is turned off. Thus, emission of light from the light emitters S1a and S3a of the photoelectric sensors S1 and S3 is resumed. Meanwhile, the light emitter S4a of the sensor 4 keeps emitting light throughout the entire process. The inputs (inputs 2) from all the sensors S1 through S5 are read in step 35, and the two sets of inputs (inputs 1 and 2) are compared in step 36. It is then determined in step 37 whether the logic state has been reversed or not for each of the sensors S1 through S5. If the logic state of any particular sensor is reversed as is the case with the sensors S1 and S3, the program flow advances to step 38 and it is determined that it is equipped with an external diagnostic function. If the logic state of any particular sensor is not reversed as is the case with the sensors S2, S4 and S5, it is determined that it is not equipped with the external diagnostic function in step 39. Then, in either case, the program flow advances to step 40 and the obtained result is written into the sensor table in the RAM 14. And, this process is carried out for each of the sensors concerned.

Now, the process of sensor diagnosis using this sensor table is described in the following.

Figure 5:
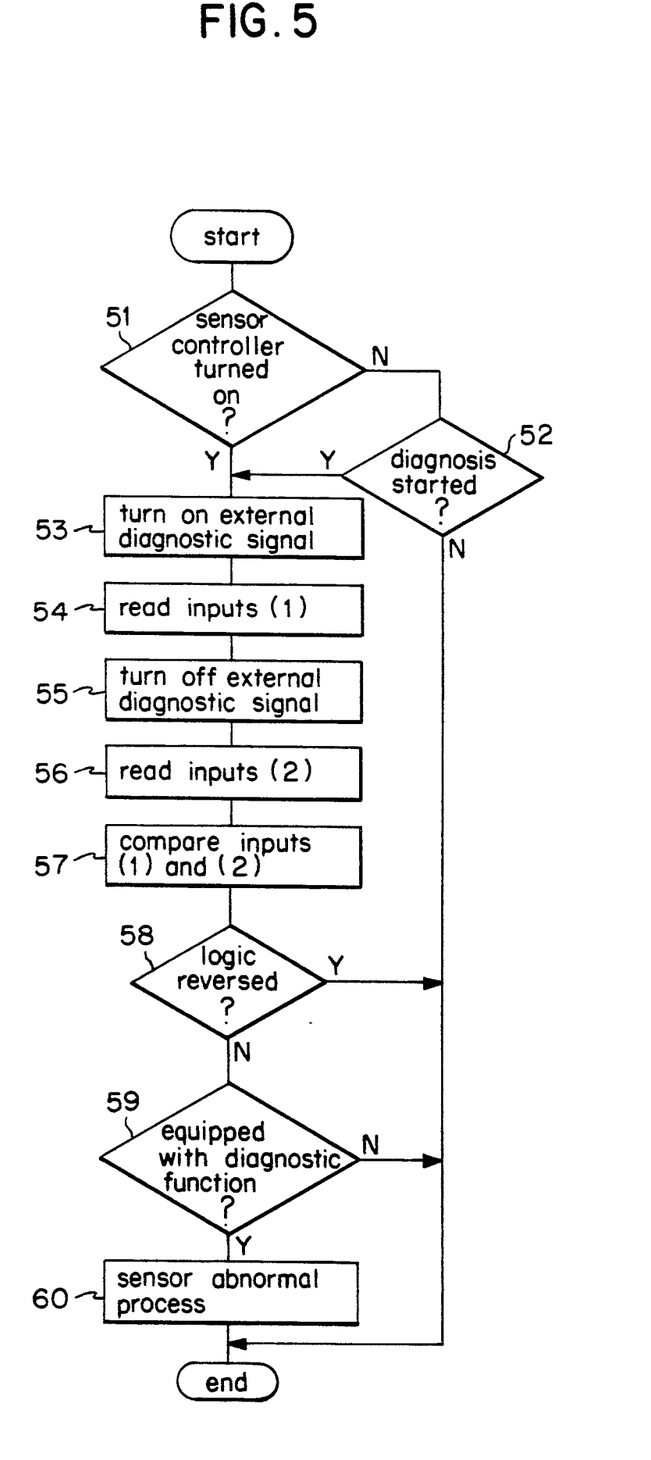
FIG. 5 is a flow chart showing the process of diagnosing the sensors according to the first embodiment of the present invention.

FIG. 5 is a flow chart of the process of sensor diagnosis which is initiated by turning on the power to the sensor controller 2 or by giving a diagnosis signal at an arbitrary time point (steps 51 and 52). When a diagnosis is started, an external diagnostic output is produced from the sensor controller 2 in step 53. Thus, emission of light from the light emitters S1a and S3a is turned off. At this point, the inputs (inputs 1) to the sensors S1 through S5 are fed to the input circuit 11 to be temporarily stored in the RAM 14. The program flow then advances to step 55 to turn off the external diagnostic output. Thus, the light emitters S1a and S3a of the sensors S1 and S3 resume emission of light. On the other hand, the light emitter S4a always keeps emitting light. In this state, the inputs (inputs 2) from the sensors S1 through S5 are read and temporarily stored in the RAM 14 (step 56). The program flow advances to steps 57 and 58 where the inputs 1 and the inputs 2 are compared for each of the sensors to determine whether the two logic states of the associated outputs are reversed or not.

If the logic state is reversed in step 58, it means that the sensor is in good order, and execution of the program comes to an end. In regards to those sensors whose logic states are not reversed, the program flow advances from step 58 to step 59 and it is determined whether each of the sensors is provided with an external diagnostic function or not. If the particular sensor is equipped with an external diagnostic function, the sensor is then determined to be faulty so that the program flow advances to step 60 to carry out a sensor abnormal processing. If the sensor is not equipped with an external diagnostic function, it means that the sensor is in good order, and the execution of the program is terminated in this case also. The process in steps 53 through 60 is repeated for each of the sensors until all the sensors have been covered, and the sensor controller 2 produces a sensor abnormal signal when any abnormal condition of any one of the sensors is detected.

Thus, according to the present embodiment, even when the sensors include those having an external diagnostic function and those not having it are mixed together, by identifying those not having it and making a sensor table based on this identification process, it is possible to diagnose only those sensors having an external diagnostic function at the time of turning on the power to the system or at any other suitable time point at which a diagnosis is required.

Figure 6:
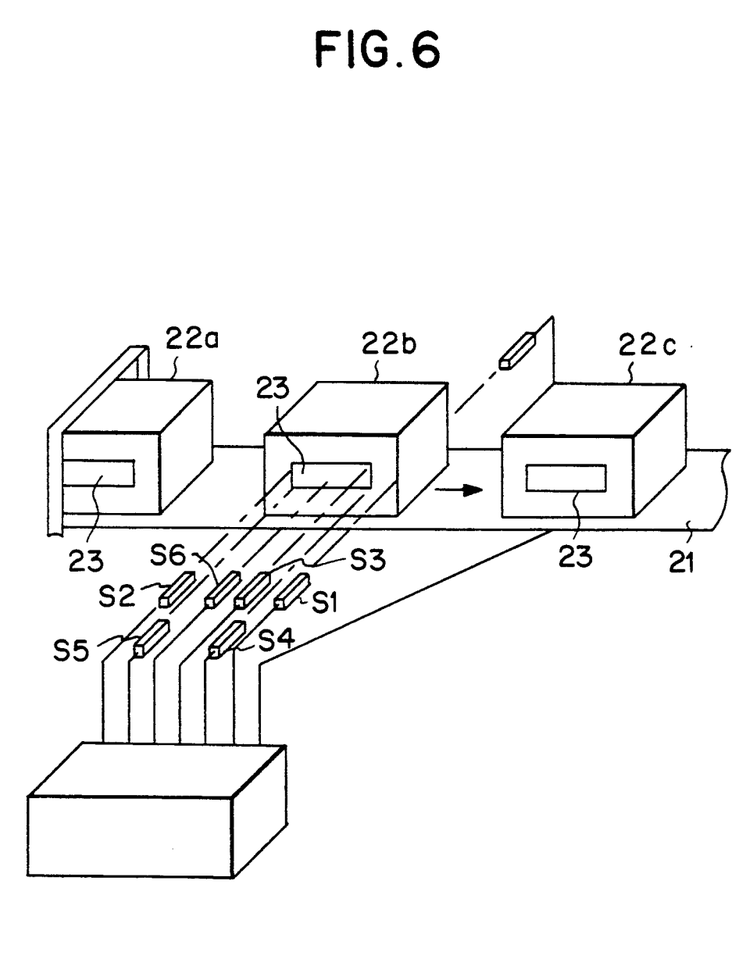
FIG. 6 is a perspective view of an arrangement of the sensors and the sensor controller according to a second embodiment of the present invention which is applied to a monitoring system for boxes carried by a conveyer belt.

A second embodiment of the present invention has a substantially identical structure to that of the first embodiment illustrated in FIG. 2. This sensor control system may be used in various applications, but the second embodiment is described in the following as being used for detecting the position of a label on each of articles (boxes) 22a, 22b, . . . which are being conveyed on a conveyer belt 21 in the direction indicated by the arrow in FIG. 6. For instance, the inclination of a label 23 attached to each of the articles is monitored for any obliqueness. Specifically, the sensor S1 is a sensor for detecting the arrival of an article, and the sensors S2 through S6 are sensors for determining the position of the label 23 attached to each of the articles which are being conveyed by the conveyer belt 21. Outputs from these sensors S1 through S6 are given to the sensor controller 2, and the positions of the labels are evaluated according to these outputs.

Figure 7:
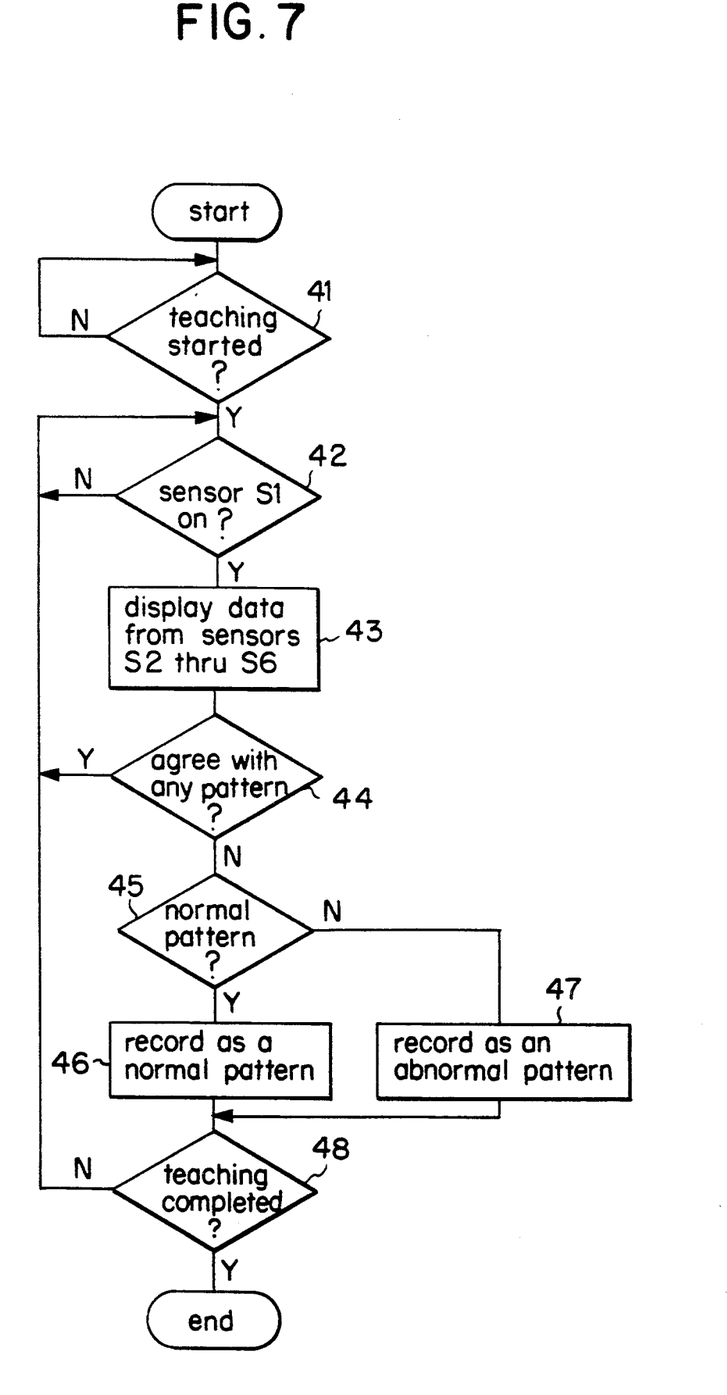
FIG. 7 is a flow chart showing a teaching process for the second embodiment of the present invention.

Now the operation of the present embodiment is described in the following with reference to a flow chart given in FIG. 7.

First of all, all the possible output patterns which can be obtained from the sensors S1 through S6 depending on the way the label is attached to each of the articles are stored. This process is called as a teaching process. In step 41, it is determined whether a teaching key in the keyboard 16 has been operated or not. If the teaching key has been operated, the program flow advances to step 42 and the arrival of a signal from the sensor S1 is awaited. When the state of the sensor S1 is turned ON, the program flow advances to step 43 where the data from the remaining sensors S2 through S6 are read through the input circuit 11, and is stored in a register at the same time as it is displayed. The program flow then advances to step 44, and the data is compared with an output pattern which has been stored as a result of the teaching process. (If step 33 is to be carried out for the first time, the output pattern is then blank.) If there is any disagreement, the program flow advances to step 45 to determine if the data corresponds to a normal output pattern or not. If it is found to a normal output pattern, it is recorded as such. If not, it is recorded in the RAM 14 as an abnormal pattern. It is thereafter determined whether the teaching process has been completed or not in step 48, and the same process is repeated by returning to step 42. Thus, as articles carrying labels in various conditions are conveyed by the conveyer belt 21, the teaching process is carried out until all the possible output patterns corresponding to normal and abnormal conditions of labels attached to the articles have been recorded.

Figure 8A:
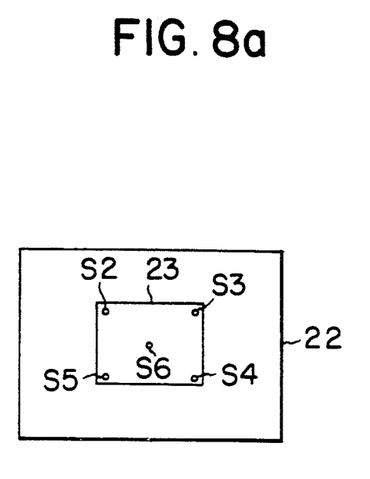
FIGS. 8(a) and 8(b) are front views of a label attached to a box in a properly and obliquely, respectively.
Figure 8B:
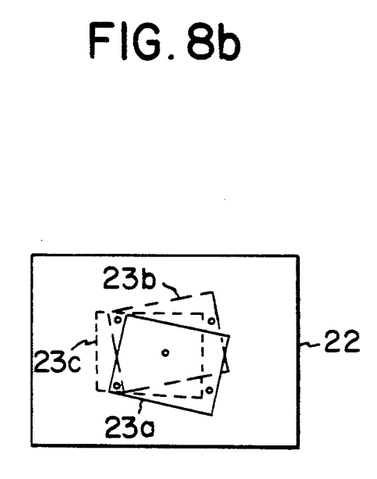
Figure 9:
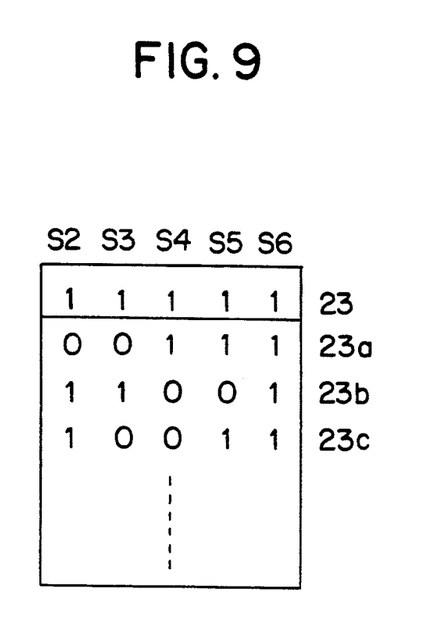
FIG. 9 is a diagram showing the contents of a sensor table listing possible normal and abnormal output patterns of the sensors.

Thus, a normal pattern "11111" as shown in FIG. 9 is defined when the sensors S2 through S6 are all turned on as shown in FIG. 8(a). When certain ones of the sensors or the sensors S2 and S3 or S4 and S5 are turned off or when a pattern "00111" or 11001" is produced, it is determined that the label 23a or 23b is obliquely attached to the article as illustrated in FIG. 8(b). Further, when the sensors S3 and S4 are turned off or when another abnormal pattern "10011" is detected, it is also determined that the label 23c is obliquely attached. In any case, the label may be obliquely attached to the article as illustrated in FIG. 8(b), but it is assumed that the label would not be so much oblique as by 90 degrees. Therefore, it is not likely to have only the sensor S6 to be turned on. When all the abnormal patterns have been stored in this manner, it is then determined whether the teaching process has been completed or not. If not, the program flow returns from step 48 to step 42 and the previously described steps are repeated. The teaching process is completed when a teaching completion input is entered from the keyboard 16.

Figure 10:
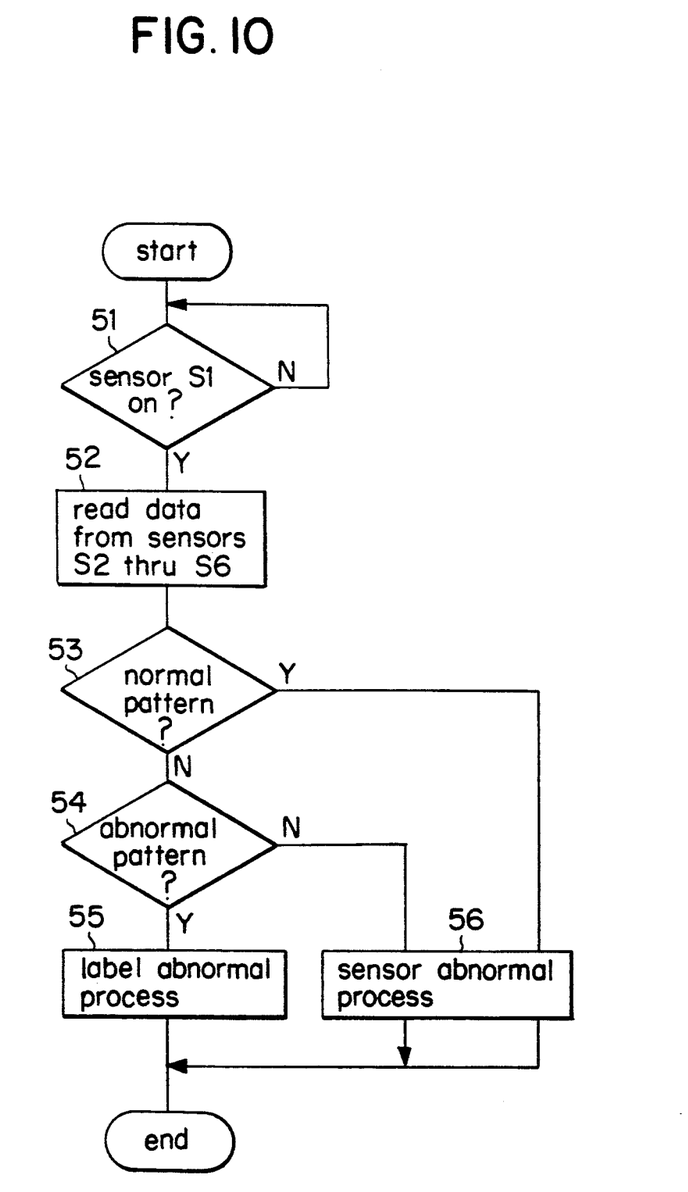
FIG. 10 is a flow chart showing the operation of the second embodiment of the present invention.

When the conditions of the articles as they are being conveyed are to be actually detected subsequent to the teaching process, it is determined whether the output from the sensor S1 is On or not in step 51 as shown in FIG. 10. If the sensor S1 is turned on, the program flow advances to step 52 to read data from the sensors S2 through S6. Then, the program flow advances to step 53 to determine whether the data from the sensors S2 through S6 corresponds to any one of the normal patterns or not. If the data does not correspond to any of the normal patterns, it is determined in step 54 whether the data corresponds to any one of the abnormal patterns stored during the teaching process or not. If it agrees with any one of the abnormal patterns, as it means that the label is not properly attached to the article, the program flow advances to routine 55 where a label abnormal process is carried out. If it does not correspond to any of the abnormal patterns in step 54, as it is probable that one of the sensors may be faulty, the program flow advances to routine 56 to carry out a sensor abnormal process which may include indication of the occurrence of an abnormal condition and transmission of a status report to a higher level system before concluding the execution of the entire process. During this process, the CPU 12 performs the functions of sensor evaluation means in step 53 through routine 56 by comparing the output pattern obtained from the sensors with the normal output patterns and abnormal output patterns corresponding to improperly attached labels or any abnormal conditions in the sensors.

According to the present embodiment, sensor outputs were stored in the storage means by attaching a label properly and obliquely in different ways, but it is also possible to directly enter such normal and abnormal output patterns of the sensors from input means such as a keyboard.

Figure 11:
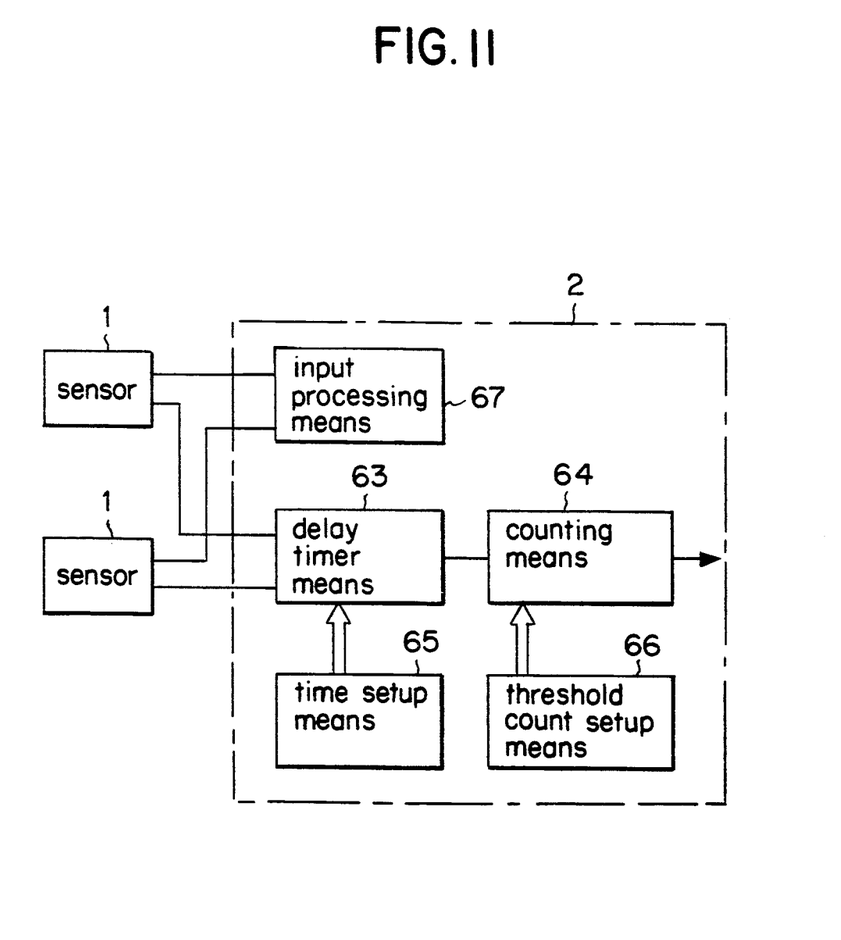
FIG. 11 is a block diagram showing the functional structure of a third embodiment of the present invention.

FIG. 11 shows the functional structure of a third embodiment of the sensor controller system of the present invention. The third embodiment comprises a plurality of sensors 1 each for producing a switching output depending on a relationship between an input signal and a threshold level, and an instability signal when the level of the input signal is in one of unstable of indeterminate regions defined above and below the threshold level, and a sensor controller 2 which receives an output from each of the sensors and determines a state of the sensor according to the switching output therefrom, wherein the sensor controller comprises: delay timer means 63 which is activated by the instability signal from any one of the sensors and delays the said output; counting means 64 which counts the number of outputs from the delay timer means and produces a sensor abnormal signal when the count has exceeded a certain threshold count; prescribed time set-up means 65 for setting up a prescribed time period on the delay timer means; count set-up means 66 for setting up the threshold count on the counter; and input processing means 67 for carrying out a certain process according to the switching output from each of the sensors.

Thus, according to the present embodiment, the prescribed time period defined as a reference for determining any abnormality of the sensors can be appropriately set up from the sensor controller according to the conveying speed of the conveying means and other surrounding conditions. Therefore, it is possible to detect any abnormality of the sensors by setting up an optimum prescribed time period of the timer and an optimum threshold count.

Figure 12:
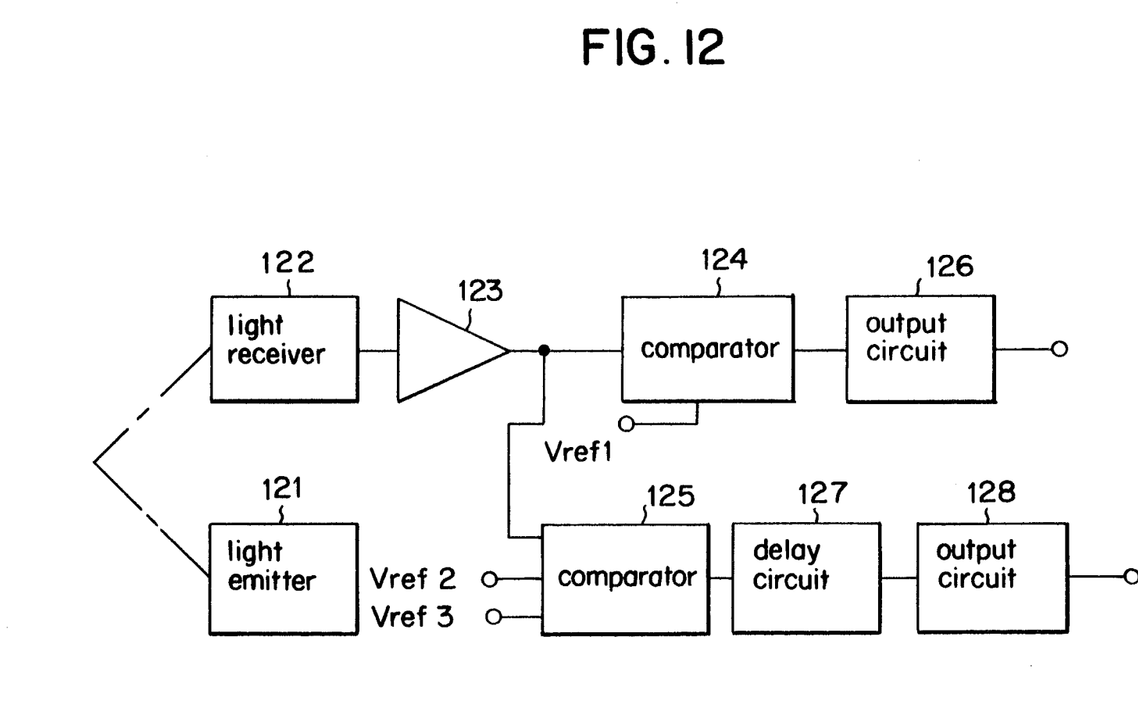
FIG. 12 is a block diagram showing the structure of one of the sensors.

This embodiment also has a similar hardware structure as the first embodiment, and is applied to a similar application as the first embodiment. Hence, reference is made to FIGS. 2 and 3 in the following description of the third embodiment where such reference is required. FIG. 12 shows the structure of one of the transmission type photoelectric sensors S1, S3 and S4. The sensor comprises a light emitter 121 and a light receiver 122 which produces an electric signal according to the level of light received thereby. An output from the light receiver 122 is supplied to comparators 124 and 125 via an amplifier 123. The comparator 124 is assigned with a certain threshold value $V_{ref1}$ for determining the presence of an article (a box) and supplies a switching output to the input circuit 11 of the sensor controller 2 via an output circuit 126. The comparator 125 is also assigned with threshold values $V_{ref2}$ and $V_{ref3}$ above and below the threshold level $V_{ref1}$, and functions as a window comparator which supplies an output to a delay circuit 127 when the input signal is located within this range. The delay circuit 127 delays signal output for a certain short time period, and its output is supplied to the sensor controller 2 via an output circuit 128 as an instability output.

The RAM 14 is provided with an area for retaining a prescribed time period set up on the delay timer for giving a condition for producing an instability signal and a threshold count.

Figure 13:
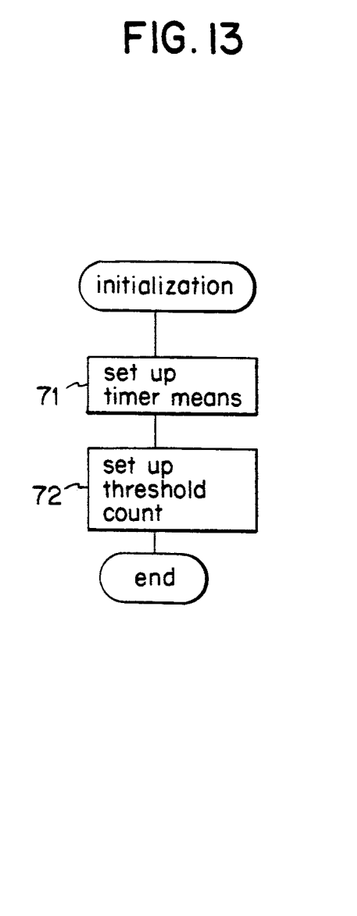
FIG. 13 is a flow chart showing the process of setting up a prescribed time period and a threshold count according to the third embodiment of the present invention.

Now the operation of the present embodiment is described in the following. FIG. 13 is a flow chart showing the operation of the present embodiment. Referring to this flow chart, an initialization step is carried out before its operation begins. Following the initialization step, a certain time period for each of the sensors S1 through S5 is assigned in routine 37. Each of these prescribed time periods serves as an on-delay time period for delaying signal output from the associated sensor when a signal of an instability level is given thereto, and supplying a first abnormal state output to the count means when the instability level signal has persisted beyond this time period. Thereafter, a count is set up in routine 72. The count is intended as a threshold count in counting the first abnormal state outputs from the delay timer means, and producing a second abnormal state output when the obtained count has exceeded the threshold count. Each sensor may be individually set up with its own prescribed time period and a threshold count or, alternatively, all the sensors may have a common prescribed time period and a common threshold count. The CPU 12 performs the functions of the prescribed time set up means 65 and the threshold count set up means 66 for setting up the prescribed time period of the delay timer means and the threshold count in routines 71 and 72.

Figure 14:
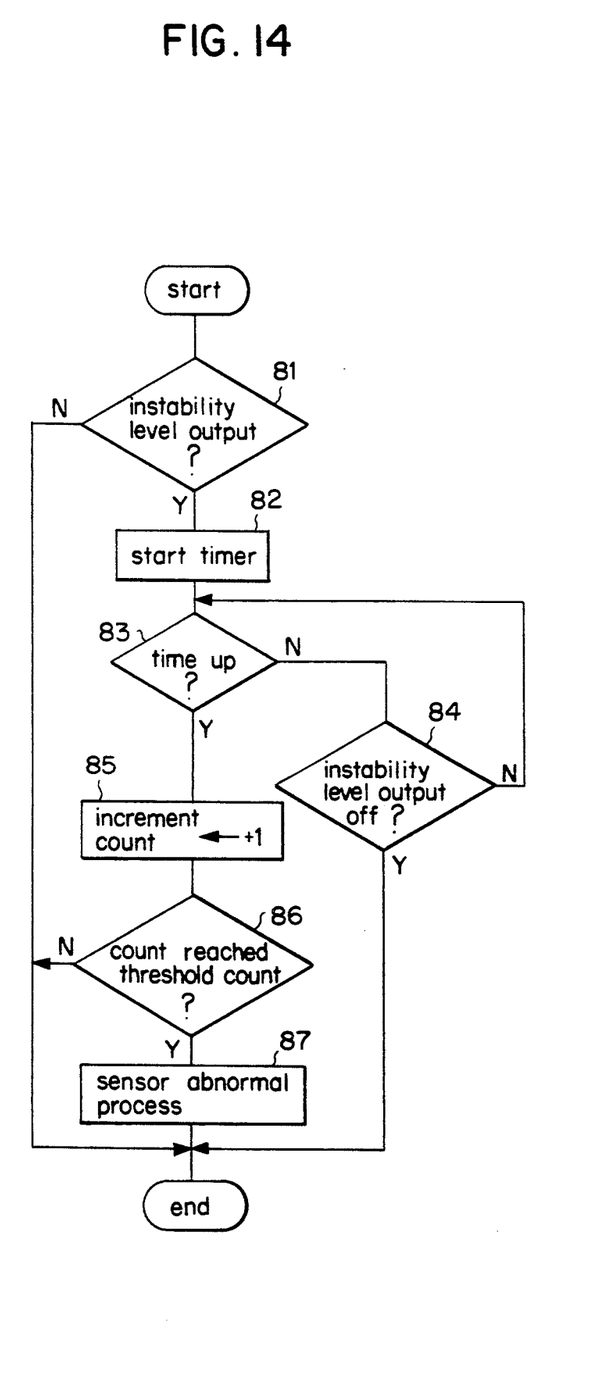
FIG. 14 is a flow chart showing the process of monitoring the soundness of the sensors according to the third embodiment of the present invention.

Now, the sensor diagnostic action of the present embodiment is described in the following. FIG. 14 shows how a sensor diagnostic process is carried out according to the third embodiment. When an instability level output is produced from any one of the sensors, the program flow advances from step 81 to step 82, and the delay timer on which a prescribed time period has been set up is started. The program flow then advances to steps 83 and 84 to await an instability level output of the sensor to be turned off before the prescribed time runs out. If the instability level output is turned off before the prescribed time period has run out, the program execution is terminated. However, if the instability level output has persisted even after the prescribed time period has run out, the program flow advances from the loop of steps 83 and 84 and to step 85 where the count is incremented. In step 86, it is determined whether the count has reached the threshold count or not. If the count has not reached the threshold count, the program execution is terminated. If the count has reached the threshold count, the program flow advances to step 87 and a sensor abnormal process is carried out before the program execution is terminated.

The CPU 12 performs the function of the delay timer means 63 which produces an output when an instability level output from any one of the sensors has persisted beyond the prescribed time period in steps 81 through 84, and the function of the counting means for determining if the count has reached the threshold count or not in steps 85 and 86. The CPU 12 also performs the function of the input processing means 67 which detects if the pattern of outputs from the sensors agrees with a certain predetermined pattern or not, and determines an article which is being conveyed to be normal when an agreement is found therebetween, although it is not shown in this particular flow chart.

Thus, according to the present embodiment, since the prescribed time period and the threshold count for the instability level output are set up from the sensor controller, selection of their values can be freely made to suit each particular control object.

What we claim is:

1. A sensor controller system, comprising:
    a plurality of sensors for producing detection signals;
    a sensor controller for receiving outputs from said sensors and producing an evaluation signal for an external circuit;
    diagnostic signal generating means for supplying a diagnostic signal to each of the sensors;
    storage means for storing a sensor output table listing expected changes in outputs of said sensors when said diagnostic signal is supplied to said sensors; and
    sensor evaluation means for evaluating the soundness of each of said sensors by comparing changes in actual outputs from said sensors with said changes in outputs listed in said sensor output table when the diagnostic signal is supplied to the sensor.

2. A sensor controller system according to claim 1, wherein said sensor controller contains said sensor evaluating means.

3. A sensor controller system according to claim 1, wherein said sensors include first sensors which respond to said diagnostic signal and second sensors which do not respond to said diagnostic signal, and said table lists no change for each of said second sensors.

4. A sensor controller system according to claim 1, wherein said sensors consist of photoelectric sensors each photoelectric sensor including a light emitter and a light receiver, and said diagnostic signal consists of a signal which interrupts emission of light from each of said light emitters.

5. A sensor controller system, comprising:
    a plurality of sensors for producing detection signals;
    a sensor controller for receiving outputs from said sensors and producing an evaluation signal for an external circuit;
    storage means for storing possible patterns of outputs from said sensors; and
    sensor evaluation means for evaluating the soundness of each of said sensors by comparing an actual pattern of outputs obtained from said sensors with said patterns stored in said storage means.

6. A sensor controller system according to claim 5, wherein said sensors consist of optical sensors for detecting a position of an article according to an output pattern of said sensors.

7. A sensor controller system, comprising:
    a sensor for producing a detection signal;
    a sensor controller for receiving said detection signal from said sensor and producing an evaluation signal for an external circuit;
    comparators for comparing a detected sensor input with a threshold level and with indeterminate regions below and/or above said threshold level;
    timer means for producing a first abnormal state output when said detected sensor input has continued to be in said indeterminate region for more than a certain prescribed time period, and
    means for varying said prescribed time period.

8. A sensor controller system according to claim 7, further comprising counting means for counting occurrence of said first abnormal state output and producing a second abnormal state output when an obtained count has reached a certain threshold count; and means for varying said threshold count.

* * * * *